US 12,488,206 B2

(12) United States Patent
Murofushi et al.

(10) Patent No.: US 12,488,206 B2
(45) Date of Patent: Dec. 2, 2025

(54) WIRELESS TAG READING SYSTEM, MANAGEMENT DEVICE, AND METHOD

(71) Applicant: Toshiba Tec Kabushiki Kaisha, Tokyo (JP)

(72) Inventors: Nobuo Murofushi, Susono Shizuoka (JP); Shigeaki Suzuki, Gotemba Shizuoka (JP); Wataru Sakurai, Izu Shizuoka (JP); Masaki Kimura, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/757,439

(22) Filed: Jun. 27, 2024

(65) Prior Publication Data

US 2025/0086414 A1  Mar. 13, 2025

(30) Foreign Application Priority Data

Sep. 11, 2023 (JP) .................................. 2023-146970

(51) Int. Cl.
*G06K 7/10* (2006.01)
(52) U.S. Cl.
CPC .................... *G06K 7/10475* (2013.01)

(58) Field of Classification Search
None
See application file for complete search history.

(56) References Cited

U.S. PATENT DOCUMENTS

| 8,444,054 | B2 | 5/2013 | Kazama et al. |
| 10,235,544 | B2 * | 3/2019 | Mukai ................ G06K 7/10465 |

* cited by examiner

*Primary Examiner* — Thien M Le
*Assistant Examiner* — April A Taylor
(74) *Attorney, Agent, or Firm* — Kim & Stewart LLP (57) ABSTRACT

A wireless tag reading system includes wireless tag reading devices each configured to, when communicating with a wireless tag, instruct the wireless tag to transmit a response wave in a certain response format, and a management device including: a network interface configured to communicate with the reading devices, a memory that stores setting data that associates each of the reading devices with a different response format, and a processor configured to: upon receipt of a notification from a first reading device, search the memory for a first response format corresponding to the first reading device, and control the network interface to transmit, to the first reading device, information indicating the first response format. The first reading device, when communicating with a wireless tag, instructs the wireless tag to transmit a response wave in the first response format.

20 Claims, 5 Drawing Sheets

| IDENTIFICATION INFORMATION | LINK FREQUENCY | NUMBER OF MIRRORS | MASK LENGTH |
|---|---|---|---|
| 1 | 200 kHz | 2 | 0-bit |
| 2 | 200 kHz | 2 | 4-bit |
| 3 | 300 kHz | 1 | 0-bit |
| 4 | 300 kHz | 4 | 3-bit |
| 5 | 300 kHz | 8 | 4-bit |

| IDENTIFICATION INFORMATION | TASK FIELD | SETTING NUMBER |
|---|---|---|
| 1 | - | - |
| 2 | INVENTORY | 1 |
| 3 | INVENTORY | 2 |
| 4 | - | - |
| 5 | SEARCH | 4 |

FIG. 7

| NO. | TASK FIELD | LINK FREQUENCY | NUMBER OF MIRRORS | MASK LENGTH | TRANSMISSION RATE |
|---|---|---|---|---|---|
| 1 | INVENTORY | 200 kHz | 2 | 0-bit | 100 kbps |
| 2 | INVENTORY | 200 kHz | 2 | 4-bit | 100 kbps |
| 3 | INVENTORY | 300 kHz | 1 | 0-bit | 300 kbps |
| 4 | ITEM SEARCH | 200 kHz | 4 | 1-bit | 50 kbps |
| 5 | ITEM SEARCH | 200 kHz | 8 | 6-bit | 25 kbps |
| 6 | ITEM REGISTRATION | 300 kHz | 4 | 1-bit | 50 kbps |
| 7 | ITEM REGISTRATION | 300 kHz | 8 | 6-bit | 25 kbps |

TAC

FIG. 8

WIRELESS TAG READING SYSTEM, MANAGEMENT DEVICE, AND METHOD

CROSS-REFERENCE TO RELATED APPLICATION(S)

This application is based upon and claims the benefit of priority from Japanese Patent Application No. 2023-146970, filed Sep. 11, 2023, the entire contents of which are incorporated herein by reference.

FIELD

Embodiments described herein relate generally to a wireless tag reading system, a management device, and a method.

BACKGROUND

A wireless tag such as a passive radio frequency identification (RFID) generates power using radio waves emitted from a reading device and transmits a response wave using that power. When two or more wireless tags receive the radio waves emitted from the reading device, each such wireless tag may transmit the response wave.

In a situation in which two or more reading devices are used, a response wave transmitted from a wireless tag may be received and processed by a reading device that is farther away from the wireless tag than the reading device that emitted the radio waves received by the wireless tag. This can happen as a result of the farther reading device performing amplification of the received response wave and attempting to process it.

To deal with such a situation, a plurality of reading devices instruct wireless tags to transmit their response waves in different response formats or properties corresponding to the reading device. However, if two reading devices using the same response format are close to each other, those reading devices can still receive and process the same response wave. In such cases, a single wireless tag will still be processed by two reading devices redundantly.

In view of such circumstances, a technique to prevent one wireless tag from being read redundantly by a plurality of reading devices would be desirable.

SUMMARY OF THE INVENTION

Embodiments of the present disclosure provide a wireless tag reading system, a management device, and a method that can prevent one wireless tag from being read redundantly by a plurality of reading devices.

A wireless tag reading system in one embodiment comprises a plurality of wireless tag reading devices each configured to, when communicating with a wireless tag, instruct the wireless tag to transmit a response wave in a certain response format, and a management device including: a network interface configured to communicate with the reading devices, a memory that stores setting data that associates each of the reading devices with a different response format, and a processor configured to: upon receipt of a notification from a first reading device, search the memory for a first response format corresponding to the first reading device, and control the network interface to transmit, to the first reading device, information indicating the first response format. The first reading device, when communicating with a wireless tag, instructs the wireless tag to transmit a response wave in the first response format.

DETAILED DESCRIPTION

Hereinafter, embodiments will be described in detail with reference to the drawings. The present disclosure is not limited to the embodiments described below.

Figure 1:
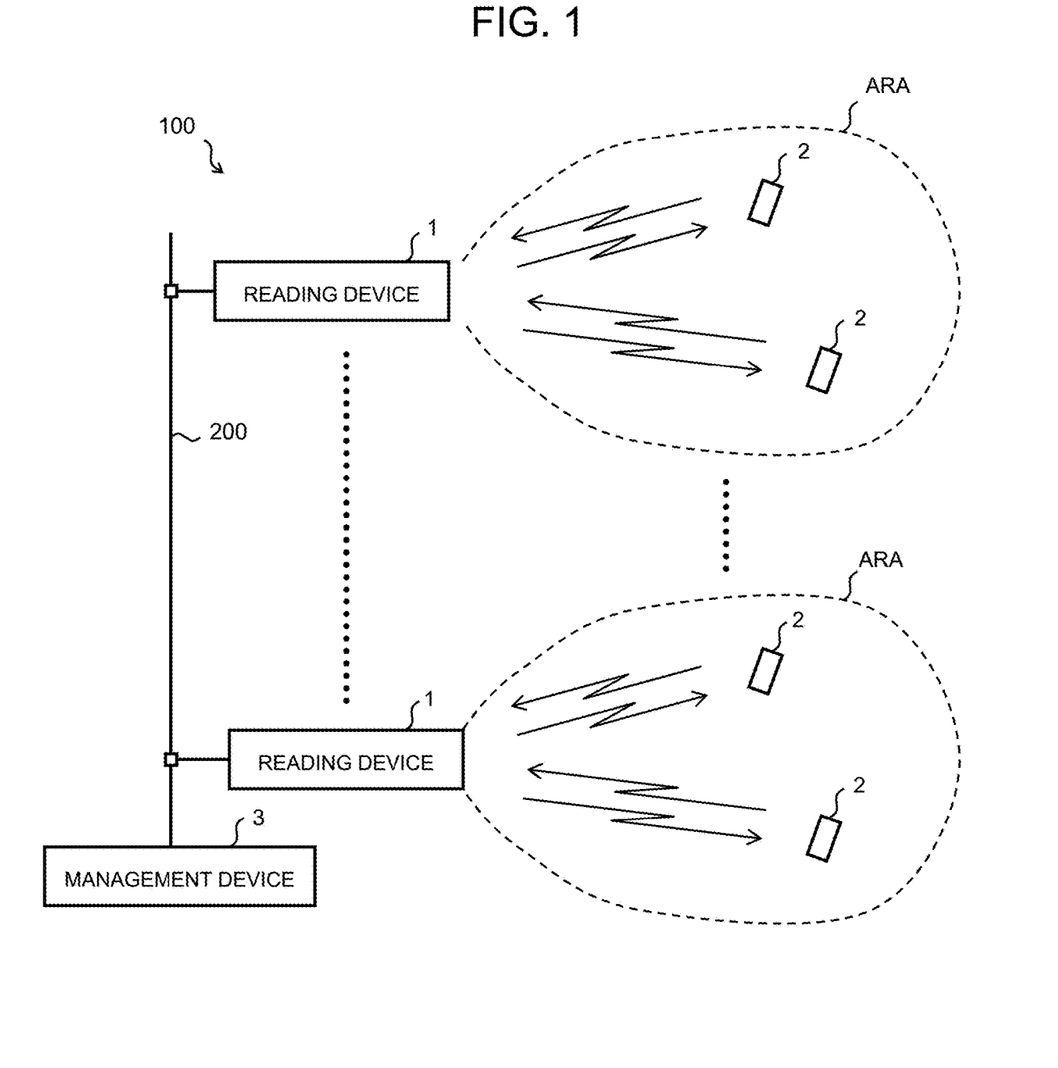
FIG. 1 is a diagram illustrating a schematic configuration of a reading system according to an embodiment.

FIG. 1 is a diagram illustrating a schematic configuration of a wireless tag reading system 100 according to an embodiment. The reading system 100 includes a plurality of wireless tag reading devices 1, a plurality of wireless tags 2, and a management device 3.

Each reading device 1 reads data stored in the wireless tags 2 located in a reading area ARA (hereinafter, referred to as tag data). The reading area ARA is an area in which the wireless tags 2 can obtain the starting power by the radio waves transmitted from the reading device 1. It is preferable that the reading areas ARA do not overlap each other.

The wireless tag 2 is activated when a radio wave transmitted from one of the reading devices 1 is received and activation power is obtained from the radio wave, and transmits a radio wave modulated by the tag data stored in advance as a response wave. The wireless tag 2 has a function of changing a response format of such a response wave in response to an instruction from the reading device 1. In an embodiment, the wireless tag 2 is capable of changing a link frequency, the number of mirrors, and a truncate mask length with respect to the response wave. That is, the response format is determined by the combination of the link frequency, the number of mirrors, and the truncate mask length. However, at least one or two of these may be changeable, or another factor may be changeable. As the wireless tag 2, a conventional radio frequency identification (RFID) tag can be used. The wireless tag 2 may be operated by electric power of a built-in battery.

The management device 3 is capable of communicating with each of the plurality of reading devices 1 included in the reading system 100 via the communication network 200. The management device 3 performs an information process as described later for managing the reading devices 1.

As the communication network 200, the Internet, a virtual private network (VPN), a local area network (LAN), a public communication network, a mobile communication network, and the like can be used singly or in combination as appropriate. Each reading device 1 is preferably wirelessly connected to the communication network 200 via a wireless access point. However, the reading device 1 may be connected to the communication network 200 in any form. For example, the reading device 1 may perform communication via the communication network 200 via another communication device such as a smartphone.

The schematic configuration of the reading system 100 described above is common to the first embodiment and the second embodiment described below.

First Embodiment

Figure 2:
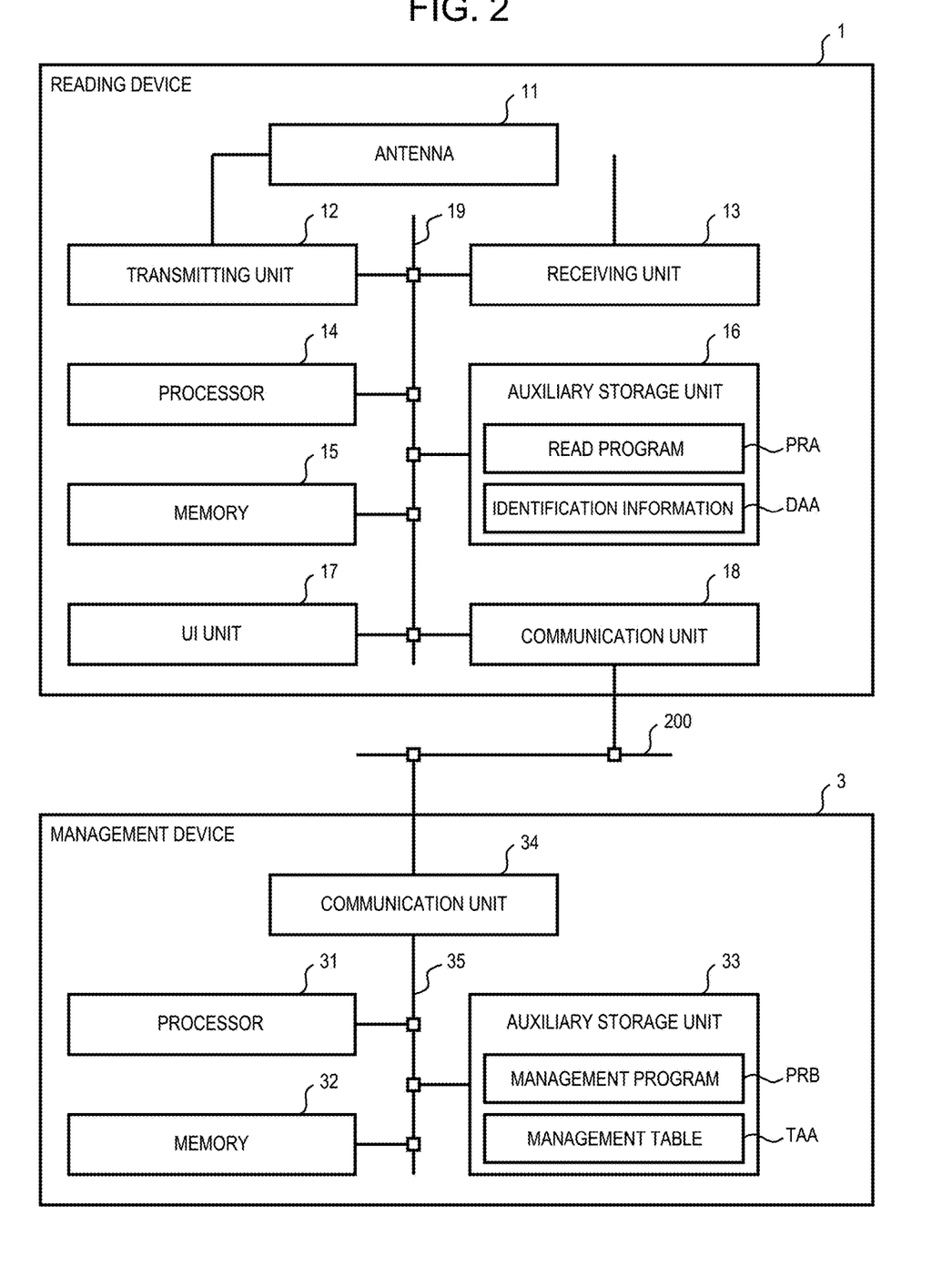
FIG. 2 is a hardware block diagram of a reading device and a management device according to a first embodiment.

FIG. 2 is a hardware block diagram of the reading device 1 and the management device 3 according to the first embodiment.

The reading device 1 includes an antenna 11, a transmitting unit 12, a receiving unit 13, a processor 14, a memory 15, an auxiliary storage unit 16, a user interface (UI) unit 17, a communication unit 18, a transmission path 19, and the like. The transmitting unit 12, the receiving unit 13, the processor 14, the memory 15, the auxiliary storage unit 16, the UI unit 17, and the communication unit 18 are connected via a transmission path 19.

The antenna 11 radiates radio waves corresponding to the electric signals supplied from the transmitting unit 12. The antenna 11 receives a radio wave (i.e., a response wave) radiated from the wireless tag 2, and outputs an electric signal corresponding to the radio wave to the receiving unit 13.

The transmitting unit 12 performs a process for transmission for requesting a response from the wireless tag 2 according to a predetermined sequence.

The receiving unit 13 decodes tag data from the response signal corresponding to the response wave transmitted from the wireless tag 2 from the electric signal obtained by the antenna 11.

By connecting the processor 14, the memory 15, and the auxiliary storage unit 16 via the transmission path 19, a controller that performs an information process for controlling the reading device 1 is configured.

The processor 14 corresponds to a core component of the reading device 1. The processor 14 executes an information process for controlling each component so as to perform various functions of the reading device 1 in accordance with a program such as an operating system and an application program.

The memory 15 includes a read-only memory area and a rewritable memory area. The read-only memory area of the memory 15 stores the program. In some cases, the read-only memory area and/or the rewritable memory area of the memory 15 store data necessary for the processor 14 to execute a process for controlling each component. The processor 14 uses the rewritable memory area as a work area.

The auxiliary storage unit 16 is, for example, an electric erasable programmable read-only memory (EEPROM). As the auxiliary storage unit 16, a hard disc drive (HDD), a solid state drive (SSD), or various other well-known storage devices may be used. The auxiliary storage unit 16 stores data used by the processor 14 to perform various types of processes and data generated by the processor 14. The auxiliary storage unit 16 may store the above-described program. In one embodiment, the auxiliary storage unit 16 stores a reading program PRA. The reading program PRA is a program for performing various functions of the reading device 1. One of the data stored by the auxiliary storage unit 16 is identification information DAA. The identification information DAA represents a predetermined identification for identifying the reading device 1. The identification information DAA may be determined as appropriate for identification in the reading system 100, or may be used as an address for identifying the reading device 1 on the communication network 200.

The user interface (UI) unit 17 performs a process for the user interface to the operator. The UI unit 17 includes, for example, a touch panel. The UI unit 17 may appropriately include various well-known input devices such as buttons and switches, or various well-known display devices such as liquid crystal display (LCD) devices and light emitting diode (LED) lamps.

The communication unit 18 is a network interface circuit that performs a process for communication via the communication network 200. As the communication unit 18, a well-known communication device conforming to the communication system of the communication network 200 can be used. That is, if the communication network 200 is a wireless LAN including a wireless access point, a wireless communication module can be used as the communication unit 18.

The transmission path 19 includes an address bus, a data bus, a control signal line, and the like, and transmits data and control signals transmitted and received between the respective connected units. Note that a radio transmission path such as Bluetooth (registered trademark) may be used as a part of the transmission path 19. That is, for example, the reading device 1 may be composed of a plurality of components, and the plurality of components may be connected by a wireless transmission path.

The transfer of the reading device 1 is generally performed in a state in which the reading program PRA is stored in the auxiliary storage unit 16. However, hardware in a state in which the reading program PRA is not stored in the auxiliary storage unit 16, or in a state in which the same type of application program is stored in the auxiliary storage unit 16, and the reading program PRA may be separately transferred. Then, the reading device 1 may be configured by writing the reading program PRA in the auxiliary storage unit 16 in accordance with an operation of an operator. The transfer of the reading program PRA can be performed via a removable recording medium such as a magnetic disk, a magneto-optical disk, an optical disk, or a semiconductor memory, or by communication via a network.

The management device 3 includes a processor 31, a memory 32, an auxiliary storage unit 33, a communication unit 34, a transmission path 35, and the like. The processor 31, the memory 32, the auxiliary storage unit 33, and the communication unit 34 can communicate with each other via the transmission path 35.

By connecting the processor 31, the memory 32, and the auxiliary storage unit 33 via the transmission path 35, a controller that performs an information process for performing various functions of the management device 3 is configured.

The processor 31 corresponds to a core component of the management device 3. The processor 31 executes an information process so as to perform various functions of the management device 3 in accordance with a program such as an operating system and an application program.

The memory 32 includes a read-only memory area and a rewritable memory area. The read-only memory area of the memory 32 stores the program. In some cases, the read-only memory area and/or the rewritable memory area of the memory 32 store data necessary for the processor 31 to execute a process for controlling each component. The processor 31 uses the rewritable memory area as a work area.

The auxiliary storage unit 33 is, for example, an EEPROM, an HDD, an SSD or any other known storage device. The auxiliary storage unit 33 stores data used by the processor 31 to perform various types of processes and data generated by the processor 31. The auxiliary storage unit 33 may store the above-described program. In an embodiment, the auxiliary storage unit 33 stores a management program PRB. The management program PRB is an application program to perform an information process for managing the reading device 1 as will be described later. A part of the storage area of the auxiliary storage unit 33 is used as an area for storing a management table TAA.

The communication unit 34 is a network interface circuit that executes a communication process for performing data communication via the communication network 200. As the communication unit 34, a well-known communication device conforming to the communication system of the communication network 200 can be used. That is, if the communication network 200 is a LAN, a LAN communication module can be used as the communication unit 34.

The transmission path 35 includes an address bus, a data bus, a control signal line, and the like, and transmits data and a control signal transmitted and received between the connected units.

The management table TAA is a data table for managing a response format to be applied to each of the reading devices 1.

Figure 3:
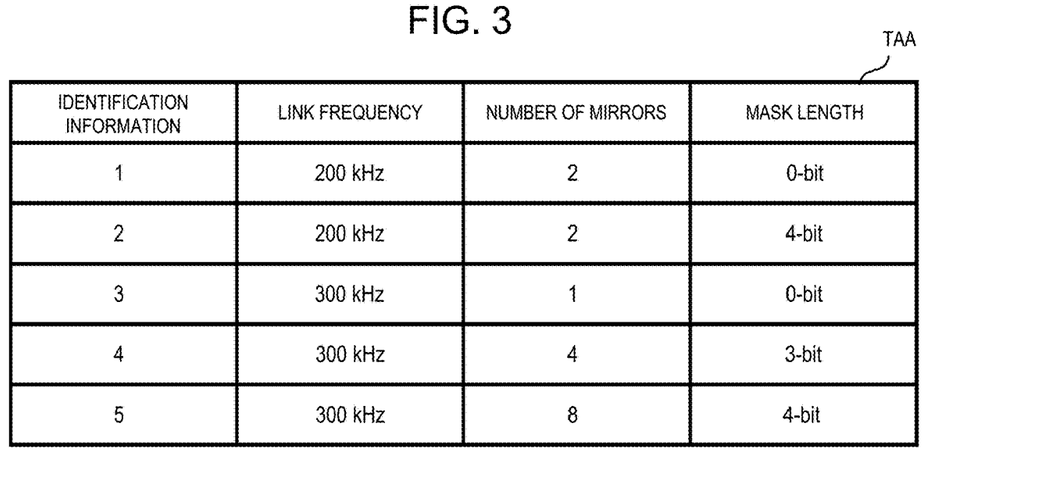
FIG. 3 is a diagram illustrating an example of a management table according to the first embodiment.

FIG. 3 is a diagram illustrating an exemplary management table TAA.

In the management table TAA illustrated in FIG. 3, for example, one of the reading devices 1 to which "1" is allocated as the identification information, is assigned a link frequency of "200 kHz", a number of mirrors of "2", and a truncate mask length of "0-bit". Further, in the management table TAA illustrated in FIG. 3, for example, another reading device 1 to which "2" is allocated as the identification information, is assigned a link frequency of "200 kHz", a number of mirrors of "2", and a truncate mask length of "4-bit". As described above, in the management table TAA, the setting is managed such that the reading device 1 to which "1" is allocated as the identification information and the reading device 1 to which "2" is allocated as the identification information apply different response formats. As illustrated in the management table TAA illustrated in FIG. 3, the response formats to be applied to all the reading devices 1 are managed.

The management device 3 is transferred, for example, in a state in which the management program PRB is stored in the auxiliary storage unit 33. However, hardware in a state in which the management program PRB is not stored in the auxiliary storage unit 33, or in a state in which the same type of application program is stored in the auxiliary storage unit 33, and the management program PRB may be separately transferred. The management device 3 may be configured by writing the management program PRB into the auxiliary storage unit 33 in accordance with an operation of an operator. The transfer of the management program PRB can be performed by recording on a removable recording medium such as a magnetic disk, a magneto-optical disk, an optical disk, a semiconductor memory, or the like, or by communication via a network.

Next, the operation of the reading system 100 configured as described above will be described.

The type of response format to be applied to each of the plurality of reading apparatuses 1 may be appropriately determined by, for example, an administrator of the reading system 100. Then, the administrator or the like accesses the management device 3 using an optional information terminal, and requests updating of the content of the management table TAA in accordance with the above-described determination. In response to this request, the processor 31 of the management device 3 updates the management table TAA.

At this time, it is desirable for the administrator or the like to determine the response format to be applied to each of the plurality of reading devices 1 so as not to overlap each other, for example, as illustrated in FIG. 3. However, in some cases, the application of the same response format is permitted, for example, when the reading areas ARA of the reading devices 1 using the same response format are not close to each other. Therefore, when updating the management table TAA in response to an instruction from the administrator or the like, the processor 31 preferably notifies the administrator or the like of the duplication of the response format to be applied. Then, the processor 31 updates the management table TAA with the content including the duplication of the response format when the duplication permission is given by the administrator or the like. However, the processor 31 may not update the management table TAA with the content including the duplication of the response format.

Figure 4:
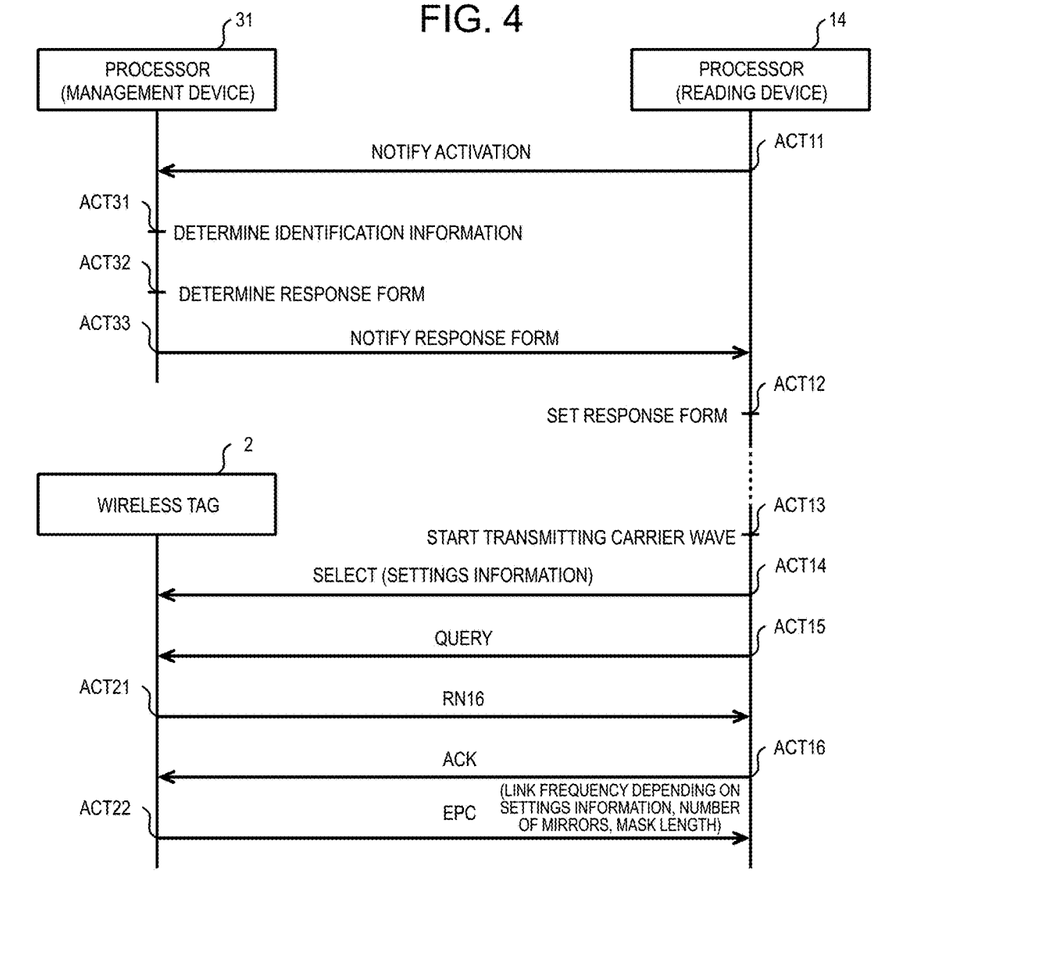
FIG. 4 is a sequence diagram related to setting of a response format to a reading device and reading of a wireless tag.

FIG. 4 is a sequence diagram related to setting of a response format to each reading device 1 and reading of the wireless tag 2.

When each reading device 1 is activated, the processor 14 of the reading device 1 starts an information process based on the reading program PRA (hereinafter, referred to as a reading process).

In ACT11, the processor 14 notifies the managing device 3 of activation. At this time, the processor 14 notifies the managing device 3 of the identification information DAA stored in the auxiliary storage unit 16. The processor 14 controls the communication unit 18 to send, for example, predetermined notification data for the activation notification, including the identification information DAA, to the managing device 3 via the communication network 200.

In the following description of the operation, the terms "reading device 1" and "processor 14" simply refer to the "reading device 1" and "processor 14" from which the activation notification has been sent.

On the other hand, in the management device 3, when the reading device 1 is activated, the processor 31 executes an information process according to the management program PRB (hereinafter referred to as a management process). The processor 31 then proceeds to ACT31, for example, when notification data for activation notification is transmitted by the communication network 200 to the managing device 3 and received by the communication unit 34.

In ACT31, the processor 31 determines the identification information of the reading device 1 based on the notification. That is, for example, if the notification data received by the communication unit 34 includes the identification information as described above, the processor 31 extracts the identification information from the notification data. If a network address for identifying the reading device 1 is used as the identification information on the communication network 200, the processor 31 may determine the identification information as the transmission source address of the notification data, for example. In this case, the processor 14 in the reading device 1 does not have to include the identification information in the notification data for the activation notification.

The processor 31 may determine identification information for identifying the communication device as long as the reading device 1 performs communication via the communication network 200 via another communication device such as a smartphone. In this case, the management table TAA also describes the identification information of the communication device.

In ACT32, the processor 31 determines the response format to be applied to the reading device 1. That is, for example, the processor 31 reads the link-frequency, the number of mirrors, and the truncate mask length associated with the identification information determined by ACT31 from the management table TAA.

In ACT33, the processor 31 notifies the reading device 1 of the response format. For example, the processor 31 controls the communication unit 34 to transmit predetermined notification data for notifying the link frequency, the number of mirrors, and the truncate mask length acquired by ACT32, to the reading device 1 via the communication network 200.

The processor 14 proceeds to ACT12 when notification data for notification of, for example, the response format is transmitted by the communication network 200 to the reading device 1 and received by the communication unit 18.

In ACT12, the processor 14 sets the notified response format as the response format to be used. That is, the processor 14 saves, for example, the link frequency, the number of mirrors, and the truncate mask length notified by the notification data received by the communication unit 18, in the memory 15 or the auxiliary storage unit 16 as the setting value regarding the response format to be used.

The processor 14 proceeds to ACT13 at any later timing, for example, when the start-of-reading is designated by a predetermined operation by the operator in the UI unit 17.

In ACT13, the processor 14 begins transmitting an unmodulated carrier wave. That is, the processor 14 instructs, for example, the transmitting unit 12 to transmit the unmodulated carrier wave. In response to this instruction, the transmitting unit 12 starts supplying a transmission signal to the antenna 11 for transmitting the unmodulated carrier wave having a predetermined frequency from the antenna 11. Upon receiving the transmission signal, the unmodulated carrier wave is transmitted from the antenna 11.

The unmodulated carrier arrives at a wireless tag 2 located in the reading area ARA. Then, in the wireless tag 2 located in the reading area ARA, the activation power is generated from the unmodulated carrier wave and is activated. Note that even if the unmodulated carrier wave reaches a wireless tag 2 located outside the reading area ARA, the wireless tag 2 cannot be activated because the activation power is not generated.

In ACT14, the processor 14 instructs the transmitting unit 12 to send a select command. In response to this instruction, the transmitting unit 12 modulates the carrier wave with a modulated signal representing the select command. In addition, the processor 14 includes, in the select command, setting information related to the response format. The setting data includes the link frequency, the number of mirrors, and the truncate mask length stored in the memory 15 or the auxiliary storage unit 16 in ACT12. When the transmitting unit 12 terminates transmitting the select command, it returns to the state for transmitting the unmodulated carrier wave.

In ACT15, the processor 14 instructs the transmitting unit 12 to send a query command. In response to this instruction, the transmitting unit modulates the carrier wave with a modulated signal representing the query command. When the transmitting unit 12 terminates transmitting the query command, it returns to the state for transmitting the unmodulated carrier.

When the activation power is generated from the unmodulated carrier wave transmitted from the reading device 1, the wireless tag 2 waits for a select command. Then, the wireless tag 2 receives the select command transmitted from the reading device 1 as described above, and proceeds to ACT21 when it corresponds to the tag specified by the select command.

In ACT21, the wireless tag 2 backscatter-transmits a 16-bit random number (RN16) during a reception period for the unmodulated carrier wave after a reception of a query command.

In the reading device 1, the processor 14 proceeds to ACT16 when the RN16 is received by the receiving unit 13.

In ACT16, the processor 14 instructs the transmitting unit 12 to send an ack command related to the RN16 received by the receiving unit 13. In response to this instruction, the transmitting unit 12 modulates the carrier wave with a modulated signal representing the ack command. When the transmitting unit 12 terminates transmitting the ack command, it returns to transmitting the unmodulated carrier wave.

The wireless tag 2 proceeds to ACT22 when it receives the ack command and the received ack command relates to the RN16 transmitted in ACT21.

In ACT22, the wireless tag 2 transmits an electronic product code (EPC) stored in the built-in memory during reception of the unmodulated carrier wave after reception of the ack command. The EPC is an exemplary identifier for identifying each of the wireless tags 2. The EPC is an exemplary tag data stored in advance in the wireless tag 2. The wireless tag 2 may transmit tag data including the EPC and data other than the EPC. Alternatively, the wireless tag 2 may transmit tag data including an identifier that differs from EPC. When transmitting the EPC, the wireless tag 2 applies the link frequency, the number of mirrors, and the truncate mask length according to the setting information included in the select command. In other words, the wireless tag 2 reflects the unmodulated carrier wave while causing a frequency shift of ±200 kHz, for example, if the linking frequency is "200 kHz". If the truncate mask length is "4-bit", the wireless tag 2 does not transmit a 4-bit string of the EPC.

In the reading device 1, the receiving unit 13 attempts to decode the EPC according to the form set in ACT12 when the radio wave transmitted by backscattering is received by the antenna 11. That is, if the link frequency in the response format set by ACT12 is "200 kHz", the receiving unit 13 processes a response wave having a spectrum centered on a frequency±200 kHz to the frequency of the unmodulated carrier wave. The receiving unit 13 performs a decoding process considering a 1-bit transmission period corresponding to the number of mirrors in the response format set by ACT12. Note that, for example, when the number of mirrors is "2", the transmission time of 1 bit is half that when the number of mirrors is "4". If the truncate mask length in the response format set in ACT12 is "4-bit", the receiving unit 13 adds a 4-bit predetermined bit string to the received data. Therefore, if data transmitted with the truncate mask length set to "3-bit" is received when the truncate mask length is set to "4-bit", data having a data length that differs from the data length of the original EPC data is obtained by adding a 4-bit string, resulting in an error in the data length. This data-length error is detected as, for example, cyclic redundancy check (CRC) error.

As described above, the reading device 1 uses the response format notified by the processor 31 in ACT33. That is, the notification of the response format by the processor 31 in ACT33 corresponds to instructing the reading device 1 to use the response format. Thus, the processor 31 executes the information process according to the management program PRB, so that the processor 31 functions as a first instruction unit. In addition, the processor 31 refers to the management table TAA in ACT32 to determine a response format in which use is instructed by the function as the first instruction unit as a response format assigned in advance to the reading device 1. Thus, the processor 31 executes the information process according to the management program PRB, so that the processor 31 functions as a determination unit. Then, the processor 31 instructs the plurality of reading devices 1 to use the separate response formats based on the management table TAA by the functions of the determination unit and the first instruction means, and the processor 31 functions as the control unit.

Thus, the response format applied by each of the plurality of reading devices 1 is centrally managed by the management device 3 and set from the management device 3 to the reading device 1. Then, different response formats are set in the plurality of reading devices 1 in which the reading area ARA may be close to each other, and the different response formats are used for reading the wireless tags 2 located in the respective reading area ARA. Thus, even if the EPC activated by the unmodulated carrier wave transmitted by the other reading device 1 and transmitted by backscattering in the response format set in the other reading device 1 reaches the reading device 1 at this timing, the receiving unit 13 cannot normally perform the above-described reception process and cannot correctly decode the EPC. In other words, the EPC of the wireless tag 2 located in the reading area ARA of the other reading device 1 is not erroneously read. Thus, it is possible to prevent one wireless tag from being read redundantly by a plurality of reading devices.

Second Embodiment

The second embodiment is different from the first embodiment in the management method performed by the management device 3. The configurations and operations of the reading device 1 and the wireless tag 2 are substantially the same as those of the first embodiment.

Therefore, the difference from the first embodiment will be mainly described below.

Figure 5:
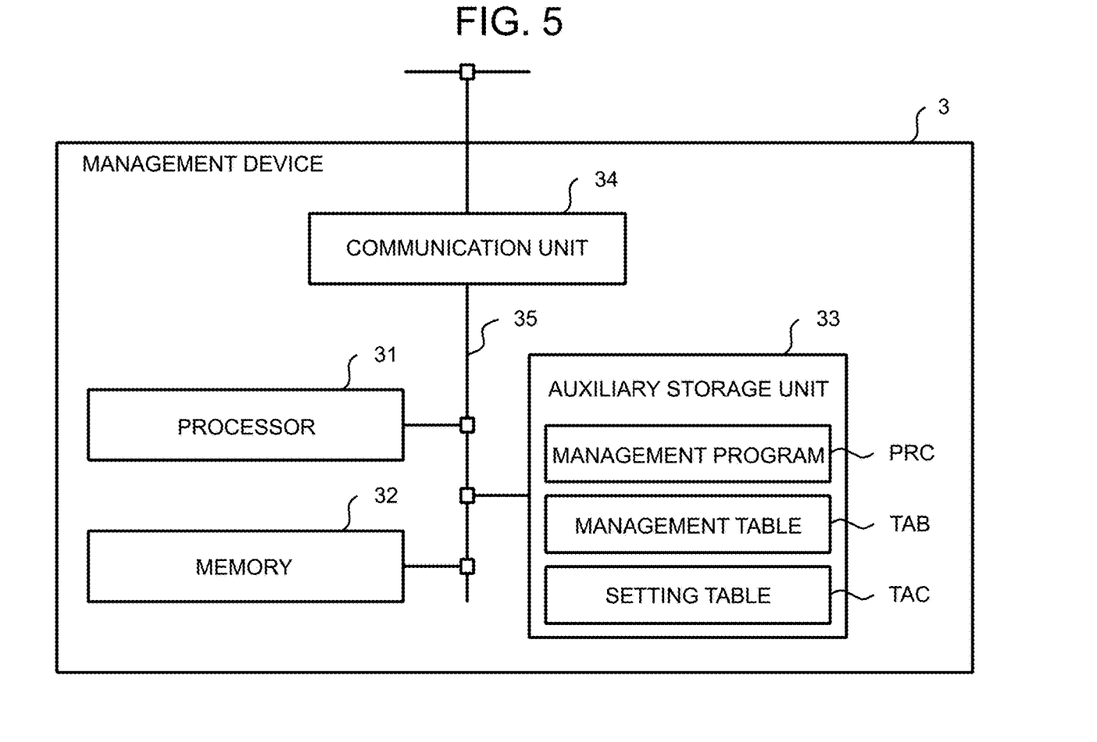
FIG. 5 is a hardware block diagram of a management device according to a second embodiment.

FIG. 5 is a hardware block diagram of the management device 3 according to the second embodiment. As illustrated in FIG. 5, the hardware configuration of the management device 3 in the second embodiment is the same as that in the first embodiment.

In the management device 3 of the second embodiment, a management program PRC is stored in the auxiliary storage unit 33 in place of the management program PRB. The auxiliary storage unit 33 stores a management table TAB in place of the management table TAA. The auxiliary storage unit 33 also stores a setting table TAC.

The management program PRC is an application program to perform an information process for managing the reading device 1 as will be described later.

The management table TAB is a data table for managing a response format to be applied to each of the reading devices 1 to be managed.

Figure 6:
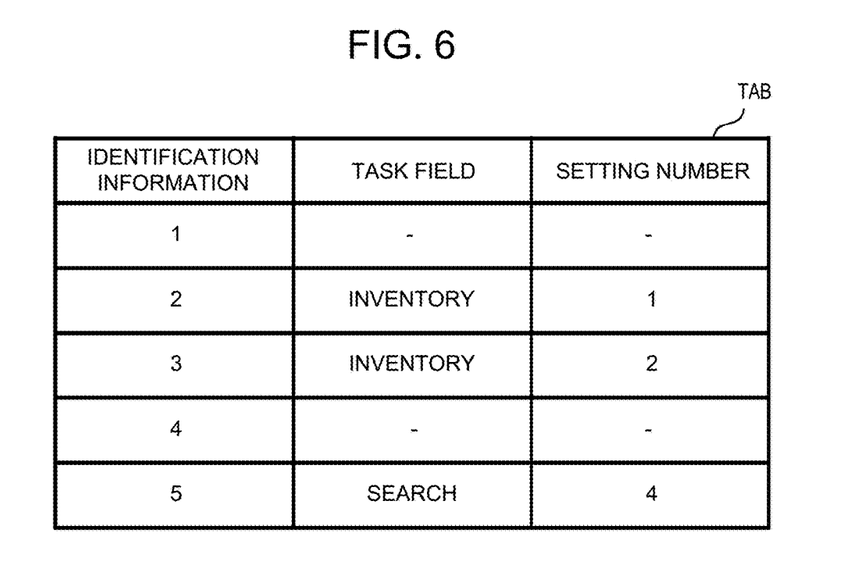
FIG. 6 is a diagram illustrating an example of a management table according to the second embodiment.

FIG. 6 is a diagram illustrating an exemplary management table TAB.

In the management table TAB illustrated in FIG. 6, for example, the reading device 1 to which "1" is allocated as the identification information is not in the operating state, and the response format to be applied to the reading device 1 is not determined. Further, in the management table TAB illustrated in FIG. 6, for example, with respect to the reading device 1 to which "2" is allocated as the identification information, "inventory" is set in the task field, and the response format identified by the setting number "1" is applied. The management table TAA is appropriately updated while the management process is executed as described later. Note that the task field is predetermined in order to distinguish between several businesses performed using the reading device 1, and in the present embodiment, the task field stores "inventory" (e.g., routine or periodic inventory at a store), "item search" (or tag search) (e.g., search for a specific item or wireless tag), or "item registration" (e.g., item registration for checkout in a store). However, the number of items to be included as the work item is arbitrary.

Figure 7:
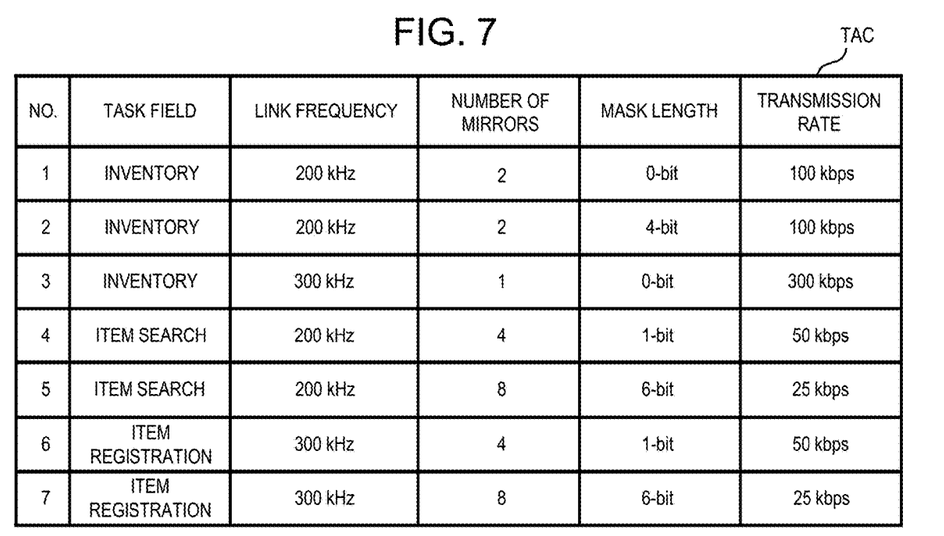
FIG. 7 is a diagram illustrating an example of a setting table according to the second embodiment.

The setting table TAC indicates a setting for which task fields are to be applied to each of a plurality of distinct response formats.

FIG. 7 is a diagram illustrating an exemplary setting table TAC. In the setting table TAC illustrated in FIG. 7, for example, a setting in which "1" is allocated as the setting number is for the task field "inventory" and indicates a response format in which the link frequency is "200 kHz", the number of mirrors is "2", the truncate mask length is "0-bit", and the transmission rate is 100 kbps. Further, in the setting table TAC shown in FIG. 7, for example, a setting in which "4" is allocated as the setting number is for the task field "search" and indicates a response format in which the link frequency is "200 kHz", the number of mirrors is "4", the truncate mask length is "1-bit", and the transmission rate is 50 kbps. Further, in the setting table TAC shown in FIG. 7, for example, a setting in which "7" is allocated as the setting number is for the task field "item registration" and indicates a response format in which the link frequency is "300 kHz", the number of mirrors is "8", the truncate mask length is "6-bit", and the transmission rate is 25 kbps.

The content of the setting table TAC is determined by, for example, the designer of the managing device 3. For example, the processor 31 may be configured to update the task field in the setting table TAC in response to a designation from an optional information terminal by an administrator of the reading system 100 or the like. In this case, when the processor 31 receives the designation for updating the task field, if the transmission rate obtained in each response format is displayed on the information terminal, the designation person of the task field can determine the task field to be associated with each response format in consideration of the transmission rate, which is convenient.

Figure 8:
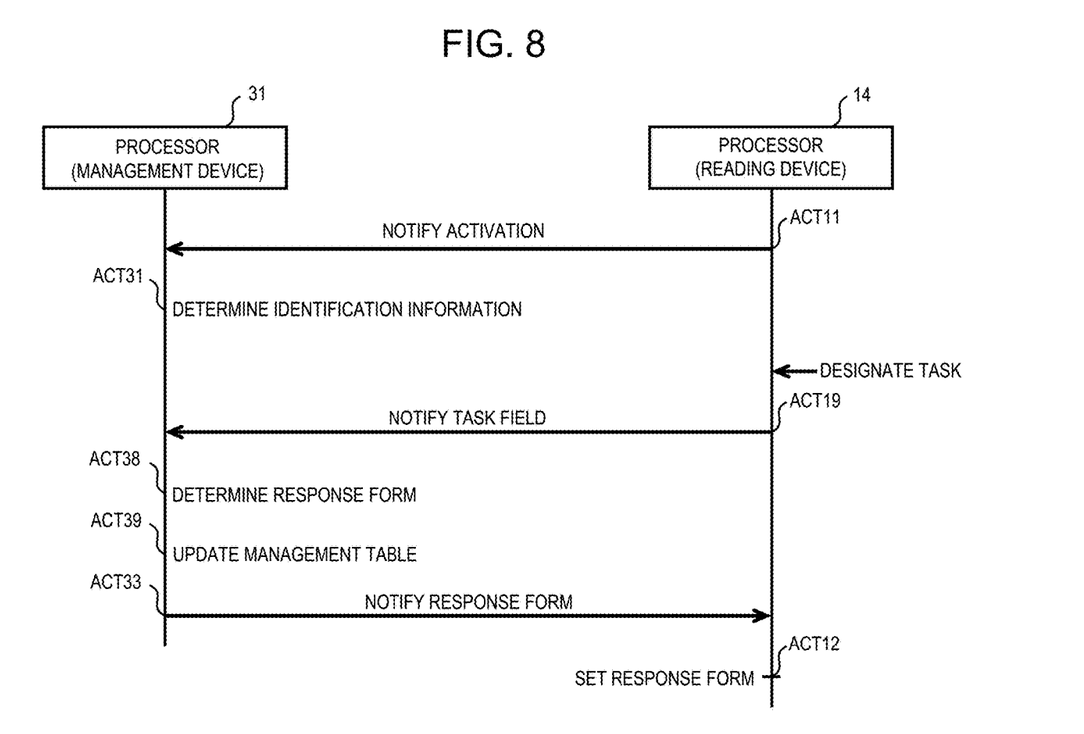
FIG. 8 is a sequence diagram related to setting of a response format to a reading device.

FIG. 8 is a sequence diagram related to setting of a response format to the reading device 1.

The operation of the second embodiment is different from that of the first embodiment in the operation related to the setting of the response format to the reading device 1 as illustrated in FIG. 8. The other operations may be the same as those of the first embodiment, and thus illustration and description thereof are omitted.

In the reading device 1, the processor 14 notifies activation in ACT11 in the same manner as in the first embodiment. In response to this notification, the processor 31 determines the identification information in ACT31 in the managing device 3 in the same manner as in the first embodiment.

The processor 14 waits for the designation of a task field after notifying the activation in ACT11. Therefore, the operator of the reading device 1 performs a predetermined operation through the UI unit 17 for designating a task field according to the business performed using the reading device 1. Then, the processor 14 proceeds to ACT19 when the operation for specifying the task field is performed in this way.

In ACT19, the processor 14 notifies the managing device 3 of the task field designated as described above. For example, the processor 14 transmits predetermined notification data for notifying a predetermined item code as the identifier of the task field designated as described above to the communication network 200 from the communication unit 18 to the management device 3.

The processor 31 waits for the notification of the service item when the identification information is determined in ACT31. Then, the processor 31 proceeds to ACT38, for example, when notification data for the notification of the task field is transmitted by the communication network 200 to the managing device 3 and is received by the communication unit 34.

In ACT38, the processor 31 determines one of the response formats set to be applied to the notified task field as the response format to be applied by the reading device 1. For example, the processor 31 refers to the setting table TAC and extracts settings that are to be applied to the notified task field. Then, the processor 31 selects a setting that is not used in the other reading device 1 from among the settings extracted here. If there are a plurality of corresponding sets, the processor 31 selects one of the plurality of settings according to a predetermined rule. Then, the processor 31 determines a response format related to the setting thus selected as a response format to be applied to the reading device 1. As a specific example, it is assumed that, when the content of the management table TAB and the setting table TAC is in the states illustrated in FIGS. 6 and 7, an activation notification is made from the reading device 1 whose identification information is "4", and "inventory" is notified as the task field. In this case, the processor 31 first extracts a setting in which the setting numbers are "1", "2", and "3" as the setting in which the task field to be applied is "inventory". Then, the processor 31 refers to the management table TAB and, since the setting with the setting numbers "1" and "2" is in use, selects the setting with the setting number "3", and determines this as a response format to be assigned to the reading device 1 with the identification information "4".

In ACT39, the processor 31 updates the management table TAB. That is, the processor 31, for example, updates the management table TAB so as to represent the notified task fields and the setting number of the setting selected by ACT38 in association with the identification information determined by ACT31. Although not shown, in the reading apparatus 1, the processor 14 notifies the management device 3 of the designation of the end of business by the operator. Then, in the management device 3, the processor 31 updates the management table TAB so as to clear the association of the task field and the setting number to the identification information of the reading device 1 that has notified the end of the business in response to the notification. In this way, the processor 31 uses the management table TAB to manage the response format being used. Thus, the processor 31 executes the information process according to the management program PRB, so that the processor 31 functions as a management unit.

Upon completion of ACT39, the processor 31 proceeds to ACT33 and notifies the reading device 1 of the above-described determined response format as in the first embodiment. In response to this notification, the processor 14 sets the notified response format as a response format using ACT12 as in the first embodiment. Note that the processor 31 may execute ACT33 prior to ACT39 after the completion of ACT38. Alternatively, the processor 31 may execute ACT33 and ACT39 in parallel after completion of ACT38.

As described above, the reading device 1 uses the response format notified by the processor 31 in ACT33. That is, the notification of the response format by the processor 31 in ACT33 corresponds to instructing the reading device 1 to use the response format. Since the processor 31 determines a response format different from that used in the other reading device 1 by ACT38, it instructs the use of a response format different from that used in the other reading device 1. Thus, the processor 31 executes the information process according to the management program PRC, so that the processor 31 functions as the second instruction unit. Note that the processor 31 determines, in ACT38, a response format associated with the task fields to be performed by the reading device 1. The task field indicates the purpose of reading by the reading device 1. That is, the processor 31 instructs the use of the response format associated with the purpose of reading by the reading device 1 by the function of the second instructing unit.

As a result, the reading system 100 can prevent one wireless tag from being read redundantly by a plurality of reading device in the same manner as in the first embodiment in the second embodiment. Further, according to the second embodiment, it is possible to realize an allocation that enables efficient operation, for example, by applying a response format in which a relatively large transmission rate can be expected when used for inventory in which a large number of wireless tags 2 are to be read.

Various modifications can be made to this embodiment as follows.

In the first embodiment, the notification of the response format from the management device 3 to the reading device 1 and the setting in the reading device 1 in the notified response format may be performed at a timing different from the timing at which the reading device 1 is activated. For example, in response to the update of the management table TAA, the management device 3 may notify the response format to all the reading devices 1 or to the reading device 1 in which the response format to be used has been changed. In this case, for example, the reading device 1 may change the setting of the response format to be used when the response format is notified, and may use the setting in subsequent operations.

In the second embodiment, in ACT38 in FIG. 8, the processor 31 may determine one response format in consideration of other terms of task fields.

In the second embodiment, the processor 31 may determine the response format of any one of the unavailable response formats without associating the task field with the response format, in ACT38 in FIG. 8, or may determine the response format of one of the unavailable response formats according to a condition unrelated to the task field.

In the second embodiment, the reading device 1 is not limited to being used in business, and the purpose of reading by the reading device 1 may be determined to be independent of business.

Each of the functions performed by the processor 14 and the processor 31 may be performed by hardware that executes an information process that is not based on a program such as a logic circuit or the like. Each of the above-described functions can also be performed by combining software control with hardware such as the above-described logic circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A wireless tag reading system, comprising:
    a plurality of wireless tag reading devices each configured to, when communicating with a wireless tag, instruct the wireless tag to transmit a response wave in a certain response format; and
    a management device including:
        a network interface configured to communicate with the plurality of wireless tag reading devices,
        a memory that stores setting data that associates each of the plurality of wireless tag reading devices with a different response format, and
        a processor configured to:
            upon receipt of a notification from a first reading device, search the memory for a first response format corresponding to the first reading device, and
            control the network interface to transmit, to the first reading device, information indicating the first response format, wherein
    the first reading device, when communicating with a wireless tag, instructs the wireless tag to transmit a response wave in the first response format.

2. The wireless tag reading system according to claim 1, wherein the setting data associates identification information of each of the plurality of wireless tag reading devices with a different response format and each different response format comprises a different combination of a link frequency, a number of mirrors, and a truncate mask length.

3. The wireless tag reading system according to claim 1, wherein
    the management device further includes an input device, wherein
    the processor is configured to, when a second response format is designated for a second reading device via the input device, store in the setting data the designated second response format in association with the second reading device.

4. The wireless tag reading system according to claim 3, wherein the processor is configured to, after the second response format is designated for the second reading device via the input device:
    determine whether the second response format has been associated with another reading device in the setting data, and
    upon determining that the second response format has been associated with another reading device in the setting data, issue a warning signal.

5. The wireless tag reading system according to claim 1, wherein the processor is configured to, upon receipt of information indicating a task to be done using a third reading device, determine a third response format for the third reading device, and store in the setting data the determined third response format in association with the third reading device.

6. The wireless tag reading system according to claim 5, wherein the task is inventory, item search, or item registration.

7. The wireless tag reading system according to claim 1, wherein the first reading device transmits to the wireless tag a command indicating the first response format at the beginning of communication with the wireless tag.

8. A management device for managing a plurality of wireless tag reading devices each configured to, when communicating with a wireless tag, instruct the wireless tag to transmit a response wave in a certain response format, the management device comprising:
    a network interface configured to communicate with the plurality of wireless tag reading devices;
    a memory that stores setting data that associates each of the plurality of wireless tag reading devices with a different response format; and
    a processor configured to:
        upon receipt of a notification from a first reading device, search the memory for a first response format corresponding to the first reading device, and
        control the network interface to transmit, to the first reading device, a first command indicating the first response format, the first command causing the first reading device to, when the first reading device communicates with a wireless tag, instruct the wireless tag to transmit a response wave in the first response format.

9. The management device according to claim 8, wherein the setting data associates identification information of each of the plurality of wireless tag reading devices with a different response format and each different response format comprises a different combination of a link frequency, a number of mirrors, and a truncate mask length.

10. The management device according to claim 8, further comprising:
    an input device, wherein
    the processor is configured to, when a second response format is designated for a second reading device via the input device, store in the setting data the designated second response format in association with the second reading device.

11. The management device according to claim 10, wherein the processor is configured to, after the second response format is designated for the second reading device via the input device:
    determine whether the second response format has been associated with another reading device in the setting data, and
    upon determining that the second response format has been associated with another reading device in the setting data, issue a warning signal.

12. The management device according to claim 8, wherein the processor is configured to, upon receipt of information indicating a task to be done using a third reading device, determine a third response format for the third reading device, and store in the setting data the determined third response format in association with the third reading device.

13. The management device according to claim 12, wherein the task is inventory, item search, or item registration.

14. The management device according to claim 8, wherein the first reading device transmits to the wireless tag a command indicating the first response format at the beginning of communication with the wireless tag.

15. A method performed by a management device for managing a plurality of wireless tag reading devices each configured to, when communicating with a wireless tag, instruct the wireless tag to transmit a response wave in a certain response format, the method comprising:
    storing, in a memory, setting data that associates each of the plurality of wireless tag reading devices with a different response format;
    upon receipt of a notification from a first reading device, searching the memory for a first response format corresponding to the first reading device; and
    transmitting to the first reading device a first command indicating the first response format, the first command causing the first reading device to, when the first reading device communicates with a wireless tag, instruct the wireless tag to transmit a response wave in the first response format.

16. The method according to claim 15, wherein the setting data associates identification information of each of the plurality of wireless tag reading devices with a different response format and each different response format comprises a different combination of a link frequency, a number of mirrors, and a truncate mask length.

17. The method according to claim 15, further comprising:
    receiving a designation of a second response format for a second reading device via an input device; and
    storing in the setting data the designated second response format in association with the second reading device.

18. The method according to claim 17, further comprising, after the second response format is designated for the second reading device via the input device:
    determining whether the second response format has been associated with another reading device in the setting data; and
    upon determining that the second response format has been associated with another reading device in the setting data, issuing a warning signal.

19. The method according to claim 15, further comprising:
    receiving information indicating a task to be done using a third reading device;
    determining a third response format for the third reading device; and
    storing in the setting data the determined third response format in association with the third reading device.

20. The method according to claim 19, wherein the task is inventory, item search, or item registration.

* * * * *